(12) United States Patent
Ono

(10) Patent No.: US 11,565,451 B2
(45) Date of Patent: Jan. 31, 2023

(54) RESIN MOLDED MEMBER OF VEHICLE LAMP AND VEHICLE LAMP

(71) Applicant: STANLEY ELECTRIC CO., LTD., Tokyo (JP)

(72) Inventor: Masayuki Ono, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 1199 days.

(21) Appl. No.: 16/107,370

(22) Filed: Aug. 21, 2018

(65) Prior Publication Data

US 2019/0061218 A1 Feb. 28, 2019

(30) Foreign Application Priority Data

Aug. 24, 2017 (JP) .............................. JP2017-160992

(51) Int. Cl.
*B32B 3/28* (2006.01)
*B29C 45/37* (2006.01)
(Continued)

(52) U.S. Cl.
CPC .......... *B29C 45/37* (2013.01); *B29C 45/0046* (2013.01); *B32B 3/28* (2013.01); *B60Q 1/04* (2013.01); *B60R 11/00* (2013.01); *B60R 13/005* (2013.01); *B60R 13/02* (2013.01); *B60R 13/04* (2013.01); *F21S 41/00* (2018.01); *F21S 41/19* (2018.01); *F21S 41/192* (2018.01); *F21S 43/50* (2018.01); *F21V 15/01* (2013.01); *F21V 15/012* (2013.01); *F21V 21/00* (2013.01);
(Continued)

(58) Field of Classification Search
CPC ...... B60Q 1/04; B60Q 1/0483; B60Q 1/0408; B29C 45/37; B29C 45/0046
See application file for complete search history.

(56) References Cited

U.S. PATENT DOCUMENTS 5,045,268 A * 9/1991 Sorensen ............ B29C 45/1635
264/328.8
6,059,432 A * 5/2000 Nagayama .......... B29C 45/0046
362/546
(Continued)

FOREIGN PATENT DOCUMENTS

JP    H10-247403 A    9/1998
JP    2001-135104 A   5/2001
(Continued)

OTHER PUBLICATIONS

English translation of Office Action for related Japanese patent application No. 2017-160992 dated Jun. 8, 2021.

*Primary Examiner* — Alicia J Sawdon
(74) *Attorney, Agent, or Firm* — Kenealy Vaidya LLP

(57) ABSTRACT

A resin molded member for a vehicle lamp includes a first resin molded part, a second resin molded part, a bent resin molded part bent and molded to have a groove section between the first resin molded part and the second resin molded part, and a rib wall that is disposed inside the groove section and that is configured to connect between a first inclined wall and a second inclined wall which form the groove section of the bent resin molded part, wherein the rib wall is formed at a position overlapping with a gate mark which is formed on at least one of the first inclined wall and the second inclined wall through injection molding.

7 Claims, 2 Drawing Sheets

(51) Int. Cl.
- *B29C 45/00* (2006.01)
- *F21S 43/50* (2018.01)
- *B60Q 1/04* (2006.01)
- *B60R 13/02* (2006.01)
- *B60R 13/04* (2006.01)
- *B60R 13/00* (2006.01)
- *B60R 11/00* (2006.01)
- *F21S 41/19* (2018.01)
- *F21S 41/00* (2018.01)
- *F21V 15/01* (2006.01)
- *F21V 21/00* (2006.01)
- *B29L 31/30* (2006.01)
- *B29L 31/00* (2006.01)
- *F21S 45/00* (2018.01)

(52) U.S. Cl.
CPC .............. *B29C 2045/0027* (2013.01); *B29L 2031/3055* (2013.01); *B29L 2031/747* (2013.01); *F21S 45/00* (2018.01); *Y10T 428/24628* (2015.01)

(56) References Cited

U.S. PATENT DOCUMENTS

2013/0148363 A1* 6/2013 Choquet ............... B29C 45/16
362/335
2016/0082878 A1* 3/2016 Steinhilb ............ B60Q 1/0408
248/548

FOREIGN PATENT DOCUMENTS

| JP | 2011-146227 A | 7/2011 |
| JP | 2013-206835 A | 10/2013 |

* cited by examiner

RESIN MOLDED MEMBER OF VEHICLE LAMP AND VEHICLE LAMP

CROSS-REFERENCE TO RELATED APPLICATION

Priority is claimed on Japanese Patent Application No. 2017-160992, filed Aug. 24, 2017, the content of which is incorporated herein by reference.

BACKGROUND OF THE INVENTION

Field of the Invention

The present invention relates to a resin molded member of a vehicle lamp and a vehicle lamp.

Description of Related Art

In the related art, resin molded members of a vehicle lamp obtained through injection molding are known (for example, see Japanese Unexamined Patent Application, First Publication No. 2011-146227). However, in such resin molded members, a fragile portion referred to as a weldline may occur at a portion in a mold (cavity) at which molten resins merge.

For example, in Japanese Unexamined Patent Application, First Publication No. 2011-146227, in order to prevent the occurrence of a weldline, wall thicknesses of the resin molded members are partially reduced (concave sections are formed) such that the molten resin injected into the cavity from the gate uniformly flows into the entire cavity.

SUMMARY OF THE INVENTION

However, with the above-mentioned resin molded member in the related art, there are cases in which it is insufficient to merely partially reduce the wall thickness and it is not possible to prevent the occurrence of a weldline in some cases.

An aspect of the present invention is directed to providing a resin molded member of a vehicle lamp capable of preventing the occurrence of a weldline, and a vehicle lamp including such a resin molded member.

A resin molded member for a vehicle lamp of an aspect of the present invention is a resin molded member for a vehicle lamp obtained through injection molding and includes: a first resin molded part; a second resin molded part; a bent resin molded part bent and molded to have a groove section between the first resin molded part and the second resin molded part; and a rib wall that is disposed inside the groove section and that is configured to connect between a first inclined wall and a second inclined wall which form the groove section of the bent resin molded part, wherein the rib wall is formed at a position overlapping with a gate mark which is formed on at least one of the first inclined wall and the second inclined wall through the injection molding.

In the above-mentioned resin molded member for a vehicle lamp, the rib wall may be formed to protrude from a bottom surface of the groove section than a position overlapping with the gate mark.

In the above-mentioned resin molded member for a vehicle lamp, the rib wall may be formed to protrude from a bottom surface of the groove section than a folded section formed between the first inclined wall and the second inclined wall.

In the above-mentioned resin molded member for a vehicle lamp, the bent resin molded part may have a shape in which an opening angle at a position where the first inclined wall and the second inclined wall are connected to the rib wall is at least an acute angle.

In the above-mentioned resin molded member for a vehicle lamp, the groove section may be formed to extend in a direction crossing the rib wall.

A vehicle lamp of an aspect of the present invention may include the above-mentioned resin molded member.

According to the aspect of the present invention, it is possible to provide a resin molded member for a vehicle lamp capable of preventing the occurrence of a weldline, and a vehicle lamp including such a resin molded member.

DETAILED DESCRIPTION OF THE INVENTION

Figure 1:
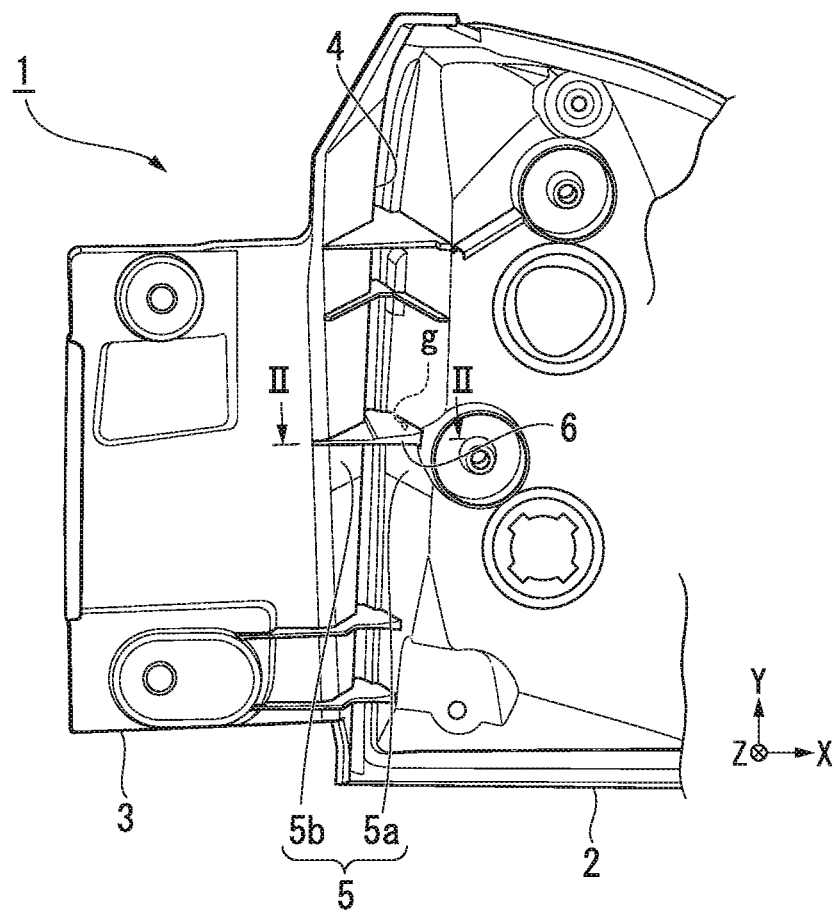
FIG. 1 is a plan view showing a resin molded member of a vehicle lamp according to an embodiment of the present invention when seen from a back surface side.

Hereinafter, an embodiment of the present invention will be described in detail with reference to the accompanying drawings.

Further, in the drawings used for the following description, in order for components to be easier to see, scales of dimensions differ for each component, and dimensional ratios or the like of the components are not necessarily the same as actual ones.

Figure 2:
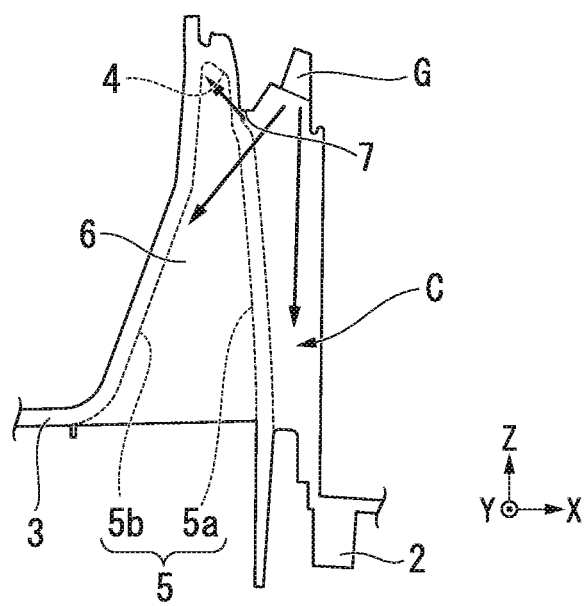
FIG. 2 is a cross-sectional view showing a state of the resin molded member taken along line II-II shown in FIG. 1 upon injection molding.

As an embodiment of the present invention, for example, a resin molded member 1 of a vehicle lamp shown in FIG. 1 and FIG. 2 will be described. Further, FIG. 1 is a plan view showing the resin molded member 1 of the vehicle lamp when seen from a back surface side. FIG. 2 is a cross-sectional view showing a state of the resin molded member 1 taken along line II-II shown in FIG. 1 upon injection molding.

In addition, in the drawings described below, an XYZ orthogonal coordinate system is set, an X-axis direction represents a leftward/rightward direction (a lengthwise direction) of the resin molded member 1, a Y-axis direction represents an upward/downward direction (a height direction) of the resin molded member 1, and a Z-axis direction represents a forward/rearward direction (a thickness direction) of the resin molded member 1.

The resin molded member 1 of the embodiment is obtained by applying the present invention to, for example, resin molded members of the vehicle lamp that constitute rear combination lamps mounted on both of corner sections of a vehicle (not shown) on the side of a rear end.

Specifically, the resin molded member 1 is a lamp body part formed of a synthetic resin obtained through injection molding. The vehicle lamp is constituted by disposing light sources such as tail lamps, brake lamps, position lamps, turn-signal lamps, or the like, inside lamp bodies constituted by lamp body parts and lens covers. In addition, when a rear combination lamp is configured, in addition to the above-mentioned configuration, for example, combination with another member such as an outer lens, an inner lens, an extension, or the like, is possible.

As shown in FIG. 1, the resin molded member 1 of the embodiment generally includes a housing 2 that is a first resin molded part, a bezel 3 that is a second resin molded part, a bent resin molded part 5 bent and molded to have a groove section 4 between the housing 2 and the bezel 3, and a rib wall 6 disposed inside the groove section 4 and configured to connect an inclined wall (a first inclined wall) 5a, consisting one side of the groove section 4 of the bent resin molded part 5, and an inclined wall (a second inclined wall) 5b, consisting the other side of the groove section 4 of the bent resin molded part 5.

The housing 2, the bezel 3, the bent resin molded part 5 (the inclined walls 5a and 5b) and the rib wall 6 are integrally formed in a thin-walled shape as a whole having a thickness of, for example, about 1.8 to 3.0 mm, by cooling and solidifying a molten resin filled in a mold (cavity). In addition, the groove section 4 is formed on the back surface side of the resin molded member 1 and formed to extend in a direction (a Y-axis direction) crossing (perpendicular in the embodiment) the rib wall 6 between the housing 2 and the bezel 3.

The bent resin molded part 5 has a shape in which an opening angle at a position where the inclined wall 5a and the inclined wall 5b are connected to the rib wall 6 is at least an acute angle. Accordingly, the groove section 4 forms a concave section having substantially a V shape in a cross section.

The rib wall 6 is formed at a position overlapping with a gate mark g formed on at least one of the inclined wall (in the embodiment, the inclined wall 5a) among the inclined wall 5a and the inclined wall 5b through injection molding.

As shown in FIG. 2, the gate mark g represents a position (a trace) of a gate G connected to a cavity C upon injection molding. The cavity C is filled with a molten resin from the gate G. Further, in the embodiment, a direct gate type in which the gate is directly connected to the cavity from a spool without intervention of a runner is employed.

The gate mark g is formed on a surface (a front surface) opposite to a surface (a back surface) of the inclined wall 5a which forms the groove section 4. In addition, the gate mark g is formed to be disposed at a substantially central section of the groove section 4.

Meanwhile, the rib wall 6 is formed to protrude upward (a −Z-axis side) from a bottom surface (a +Z-axis side) of the groove section 4 than a position overlapping with the gate mark g. Further, the rib wall 6 is formed to protrude upward (the −Z-axis side) from the bottom surface (the +Z-axis side) of the groove section 4 than a folded section 7 formed between the inclined wall 5a and the inclined wall 5b.

In the resin molded member 1 of the embodiment having the above-mentioned configuration, since the rib wall 6 is formed at the position overlapping with the gate mark g, the molten resin filled in the cavity C from the gate G upon injection molding (shown by an arrow in FIG. 2) flows toward the inclined wall 5b side from the inclined wall 5a side of the bent resin molded part 5 through a space in which the rib wall 6 is formed.

Accordingly, in the resin molded member 1, even in a shape in which an acute angle is formed between the inclined wall 5a and the inclined wall 5b and the folded section 7 is formed, the molten resin can smoothly flow toward the inclined wall 5b side from the inclined wall 5a side.

Here, the resin molded member 101 shown in FIG. 3 and FIG. 4 will be described as a comparative example.

Figure 3:
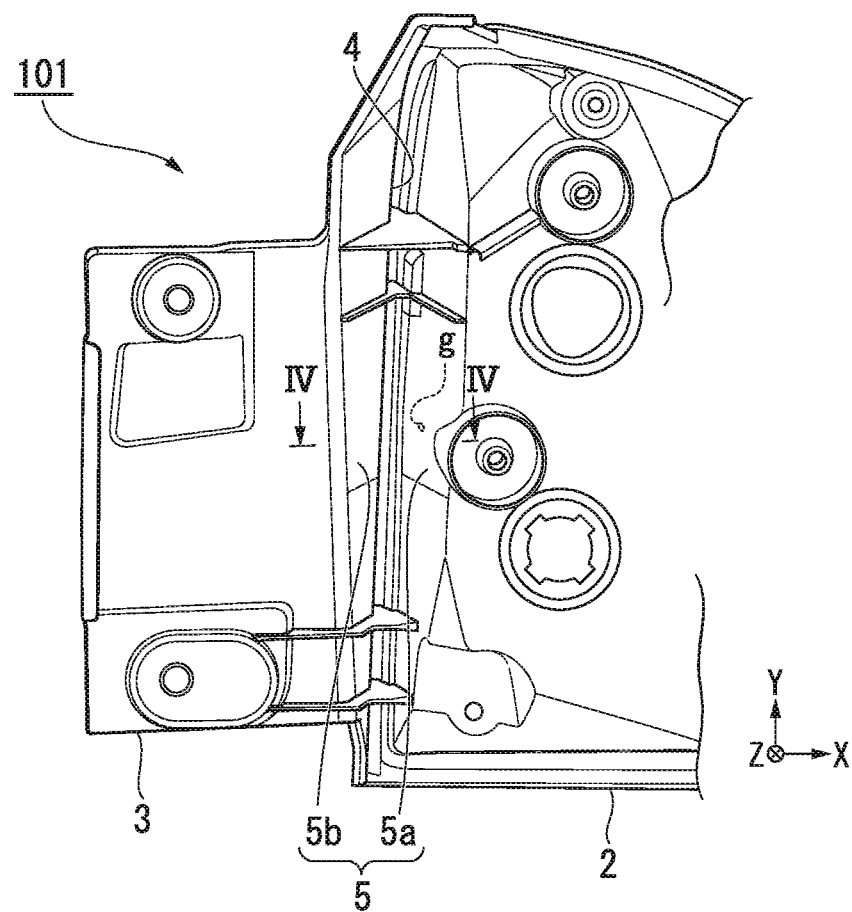
FIG. 3 is a plan view showing a resin molded member shown as a comparative example from a back surface side.

Here, FIG. 3 is a plan view showing the resin molded member 101 from a back surface side. FIG. 4 is a cross-sectional view showing a state of the resin molded member 101 taken along line IV-IV shown in FIG. 3 upon injection molding.

Figure 4:
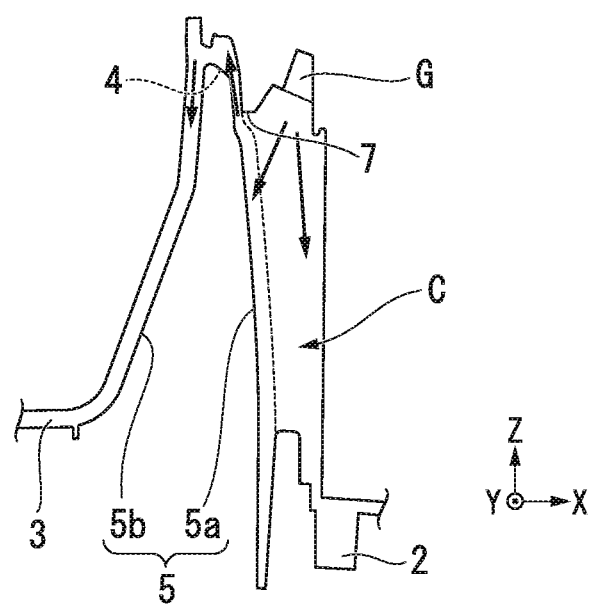
FIG. 4 is a cross-sectional view showing a state of the resin molded member taken along line IV-IV shown in FIG. 3 upon injection molding.

In addition, in the resin molded member 101 shown in FIG. 3 and FIG. 4, the same portions as the resin molded member 1 are designated by the same reference numerals in the drawings and description thereof will be omitted.

The resin molded member 101 shown in FIG. 3 as the comparative example has basically the same configuration as the resin molded member 1 except that the rib wall 6 is omitted. That is, the resin molded member 101 has a configuration in which the rib wall 6 that connects the inclined wall 5a and the inclined wall 5b is omitted between the substantially V-shaped groove section 4 in a cross section.

In the case of this configuration, as shown in FIG. 4, when the molten resin filled in the cavity C from the gate G upon injection molding (shown by arrows in FIG. 4) flows toward the inclined wall 5b side from the inclined wall 5a side of the bent resin molded part 5, the molten resin has to pass through a narrow space (a bottom section of the groove section 4) between the inclined wall 5a and the inclined wall 5b while being turned at the folded section 7, and therefore, a split flow is occurred in the flow of the molten resin along the groove section 4. In this case, a weldline is generated at the position where the split flows join.

On the other hand, in the resin molded member 1 of the embodiment, since a flow of the molten resin along the groove section 4 is improved because the rib wall 6 is formed at the position that overlaps with the gate mark g, the occurrence of the weldline can be suppressed.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

For example, while the case in which the present invention is applied to the vehicle lamp on the rear side such as a rear combination lamp and the resin molded member thereof has been exemplified in the embodiment, the vehicle lamp to which the present invention is applied and the resin molded member thereof are not limited to the above-mentioned rear side and, for example, the present invention can also be applied to a vehicle lamp on the front side such as a headlight (a headlamp) for a vehicle or the like and a resin molded member thereof.

What is claimed is:

1. A resin molded member for a vehicle lamp obtained through injection molding, the resin molded member comprising:
    a first resin molded part;
    a second resin molded part;
    a bent resin molded part bent and molded to have a groove section between the first resin molded part and the second resin molded part; and
    a rib wall that is disposed inside the groove section and that is configured to connect between a first inclined wall and a second inclined wall which form the groove section of the bent resin molded part, wherein the rib wall is formed at a position overlapping with a gate mark, and the gate mark is formed through injection molding on a surface opposite to a surface of either the first inclined wall or the second inclined wall that forms the groove section.

2. The resin molded member for a vehicle lamp according to claim 1, wherein the rib wall is formed to protrude from a bottom surface of the groove section more than a position overlapping with the gate mark.

3. The resin molded member for a vehicle lamp according to claim 1, wherein the rib wall is formed to protrude from a bottom surface of the groove section more than a folded section formed between the first inclined wall and the second inclined wall.

4. The resin molded member for a vehicle lamp according to claim 1, wherein the bent resin molded part has a shape in which an opening angle at a position where the first inclined wall and the second inclined wall are connected to the rib wall is at least an acute angle.

5. The resin molded member for a vehicle lamp according to claim 1, wherein the groove section is formed to extend in a direction crossing the rib wall.

6. The resin molded member for a vehicle lamp according to claim 1, wherein the rib wall and gate mark are located in a plane such that resin travels from a gate along a linear path to the first resin molded part and second resin molded part during injection molding.

7. A vehicle lamp comprising the resin molded member according to claim 1.

\* \* \* \* \*